(12) United States Patent
Everline et al.

(10) Patent No.: US 8,696,208 B1
(45) Date of Patent: Apr. 15, 2014

(54) BRAKE SYSTEM INCLUDING MODULAR S-CAM BUSHINGS

(76) Inventors: Chris Alan Everline, Quincy, MI (US); Drew H. Larsen, Ocala, FL (US)

( * ) Notice: Subject to any disclaimer, the term of this patent is extended or adjusted under 35 U.S.C. 154(b) by 98 days.

(21) Appl. No.: 13/415,405

(22) Filed: Mar. 8, 2012

Related U.S. Application Data (63) Continuation-in-part of application No. 12/381,453, filed on Mar. 12, 2009, now abandoned.

(60) Provisional application No. 61/478,022, filed on Apr. 21, 2011.

(51) Int. Cl.
   *F16C 33/06* (2006.01)
   *F16H 53/00* (2006.01)

(52) U.S. Cl.
   USPC .............. 384/281; 384/129; 384/274; 74/567

(58) Field of Classification Search
   USPC ......... 384/276, 280–291, 295, 297, 307, 129;
   188/205 R, 206 A, 206 R, 219, 326, 330,
   188/338, 339; 301/105.1, 124.1, 125, 132;
   280/116, 124.1, 124.28, 124.157;
   74/567
   See application file for complete search history.

(56) References Cited

U.S. PATENT DOCUMENTS

| | | | |
|---|---|---|---|
| 1,908,438 A | 5/1933 | Norton | |
| 2,331,652 A * | 10/1943 | Buckendale | 384/247 |
| 2,382,554 A | 8/1945 | Eksergian et al. | |
| 2,886,141 A | 5/1959 | House | |
| 3,076,531 A | 2/1963 | Hanley et al. | |
| 3,279,569 A * | 10/1966 | Kieser et al. | 384/422 |
| 3,497,037 A | 2/1970 | Deibel | |
| 3,574,324 A | 4/1971 | Kellogg | |
| 4,200,174 A | 4/1980 | Borugian et al. | |
| 4,346,535 A | 8/1982 | Asano et al. | |
| 4,494,290 A | 1/1985 | Rutledge | |
| 4,576,488 A | 3/1986 | Steiner et al. | |
| 4,796,731 A * | 1/1989 | Schmitt | 188/196 D |
| 4,838,389 A | 6/1989 | Mamery | |
| 5,316,111 A * | 5/1994 | Layfield | 188/205 R |
| 5,887,687 A * | 3/1999 | Williams | 188/330 |
| 5,964,325 A * | 10/1999 | Davison et al. | 188/330 |
| 5,988,614 A * | 11/1999 | Sturmon | 267/292 |
| 6,089,361 A | 7/2000 | Davison et al. | |
| 6,148,968 A * | 11/2000 | Davison | 188/206 A |
| 6,216,833 B1 | 4/2001 | Lefferts et al. | |
| 6,237,725 B1 | 5/2001 | Otterson et al. | |
| 6,240,806 B1 * | 6/2001 | Morris et al. | 74/567 |
| 6,279,695 B1 | 8/2001 | Davison | |

(Continued)

OTHER PUBLICATIONS

U.S. Appl. No. 12/381,453, filed Mar. 2009, Everline.

*Primary Examiner* — Marcus Charles (57) ABSTRACT

A device for vehicle brakes, such as truck brakes actuatable by an S-cam, and of the type having a camshaft support bracket. The device includes an S-cam shaft, and the S-cam shaft has a shaft and an S-cam provided on an end of the shaft. The device includes a mounting adapter bracket, and a bushing support tube. The mounting adapter bracket is configured for supporting the bushing support tube on the camshaft support bracket of the vehicle. The bushing support tube is configured for receiving the S-cam shaft in it. There are a number of modular bushings provided in the tube, and each of the modular bushings is spaced apart along the length of the tube. The shaft extends through the modular bushings and is supported by them.

3 Claims, 7 Drawing Sheets

(56) References Cited

U.S. PATENT DOCUMENTS

| | | |
|---|---|---|
| 6,409,280 B1 | 6/2002 | Mair |
| 6,450,073 B1 | 9/2002 | Boyer et al. |
| 7,055,662 B1 * | 6/2006 | Jones et al. .................. 188/341 |
| 7,537,224 B2 | 5/2009 | Morris et al. |
| 7,819,231 B2 | 10/2010 | Gibson, Jr. |
| 2002/0041122 A1 | 4/2002 | Mair |
| 2004/0178598 A1 | 9/2004 | Gibson |
| 2006/0244234 A1 | 11/2006 | Ramsey |

* cited by examiner

BRAKE SYSTEM INCLUDING MODULAR S-CAM BUSHINGS

CROSS REFERENCE TO RELATED APPLICATIONS

This application is a continuation-in-part of application Ser. No. 12/381,453, filed Mar. 12, 2009, which is incorporated herein by reference.

This application claims the benefit of application No. 61/478,022, filed Apr. 21, 2011, which is incorporated herein by reference.

FIELD OF THE INVENTION

This invention relates to a device for use with a brake system. More particularly, the invention relates to a device for use with a truck trailer brake system for truck brakes. Even more particularly, the invention relates to a device for use with a truck trailer brake system for truck brakes actuatable by an S-cam on an S-cam shaft.

BACKGROUND OF THE INVENTION

A PRIOR ART air brake system used on commercial trailers includes a trailer air brake actuated by an air chamber applying rotational force to an S-cam, which spreads the brake shoes open against a brake drum as the S-cam rotates, causing friction, and thereby retarding wheel rotation to cause braking. This known S-cam is part of an axle assembly and is typically supported on each end through small S-cam bushings, which keep the S-cam centered relative to the brake shoes, while allowing the cam to rotate freely.

Once those components are worn, the performance of the overall brake system is diminished, resulting in accelerated brake and drum wear and loss of braking power. Replacement of S-cams and S-cam bushings is costly and involves major dismantling of the wheel assembly.

PRIOR ART S-cam systems are subject to wear owing to vibration and high twisting loads exerted on the S-CAMs and S-CAM bushings.

PRIOR ART S-cam and S-cam bushings, which support the S-cam shaft near its ends, distribute these loads over a small surface area relative to the S-cam shaft surface area, and once these bushings wear, the S-cam bushings, and often the S-cam must be replaced.

PRIOR ART shafts which are machined smooth only on the ends, such as in the form of machined journals, can only be provided with bushings on the smooth machined outer ends. Given the rough finish of the PRIOR ART shafts in the middle, no bushing can be provided in the middle.

OBJECTS AND SUMMARY OF THE INVENTION

An object of the invention is to overcome the drawbacks of the PRIOR ART.

Another object of the invention is to make the S-cam and S-cam bushings last longer, thus keeping the S-cam centered in the spider longer, resulting in better brake performance, longevity, and cost reduction.

A further object of the invention is to provide an extended life S-cam bushing device which provides for simpler bushing replacement, even in the field.

It is another object of the invention to provide a device which allows users to alter the performance of the device based on the number of modules incorporated, determined by variable pricing.

It is yet another object of the invention to minimize the number of parts.

It is another object of the invention to provide for enhanced brake performance of brake assemblies.

It is another object of the invention to accommodate nearly a full bushing coverage area with independent bushings which prevent binding in case of manufacturing irregularities, or irregularities arising during use.

It is yet another object of the invention to optimize a ratio of grease storage to bushing surface area within an S-cam shaft and a bushing support tube, in order to optimize load bearing surface with vibration dampening and lubrication reserve from grease storage, as well as to avoid wasted grease.

It is another object of the invention to provide a plurality of bushings to spread out rotational and vibration loads better than in PRIOR ART S-cam air brake systems, to increase grease distribution throughout all bearing and non-bearing S-cam shaft surfaces, and to reduce corrosion of the S-cam shaft, and to increase the life of the S-cam bushings.

It is another object of the invention to aid manufacturability of PRIOR ART S-cam air brake systems, by using multiple modules to extend bushing surface area rather than single piece bushings which cannot be varied or achieve the benefits of the objects stated herein and which are significantly more difficult to manufacture.

In sum, the invention one of comprises, includes, consists essentially of, and consists of a device for use with vehicles of the type having brakes actuatable by an S-cam, the device including an S-cam shaft having a shaft and an S-cam fixed to an end of the shaft. There is also a bushing support tube, the bushing support tube being configured for receiving the shaft therein. A plurality of shaft support bushings are provided in the bushing support tube via press fit, each of the shaft support bushings being spaced apart along the length of the bushing support tube; and the S-cam shaft extends through the plurality of shaft support bushings and being supported thereby. The entire assembly becomes incorporated into the axle assembly via the receiving apertures within the axle spider housing and camshaft support bracket, both part of the axle weldment.

The invention further includes that the plurality of shaft support bushings includes at least three bushings, such as at least three, four, five, six or more shaft support bushings.

The invention further includes that at least two of the three or more bushings are spaced apart from each other at a distance greater than a distance between the other bushings of the three or more bushings, each of the three or more bushings includes a respective space between adjacent ones of the three or more bushings, and two of the three or more bushings include a space between them which is greater than the space between each of the other spaces between the others of the three or more bushings, for example.

The invention further includes that a grease fitting is provided on the bushing support tube and is configured for providing grease into the bushing support tube to lubricate the shaft support bushings and shaft. A grease relief valve is provided on the bushing support tube, spaced apart from the grease fitting, and configured for releasing excess grease that has been forced into the grease fitting and out of the bushing support tube.

The invention further includes that a material of at least one of the plurality of shaft support bushings includes a synthetic material, such as a molybdenum disulfide-filled nylon.

S-cam shaft is machined smooth along entire length to act as a bearing journal surface.

The invention further includes that the shaft includes a length, and the plurality of shaft support bushings provided spaced apart along the length of the bushing support tube extends substantially along the entire length of the bushing support tube.

Relative terms such as left, right, up, and down are for convenience only and are not intended to be limiting.

DETAILED DESCRIPTION OF THE INVENTION

Figure 1:
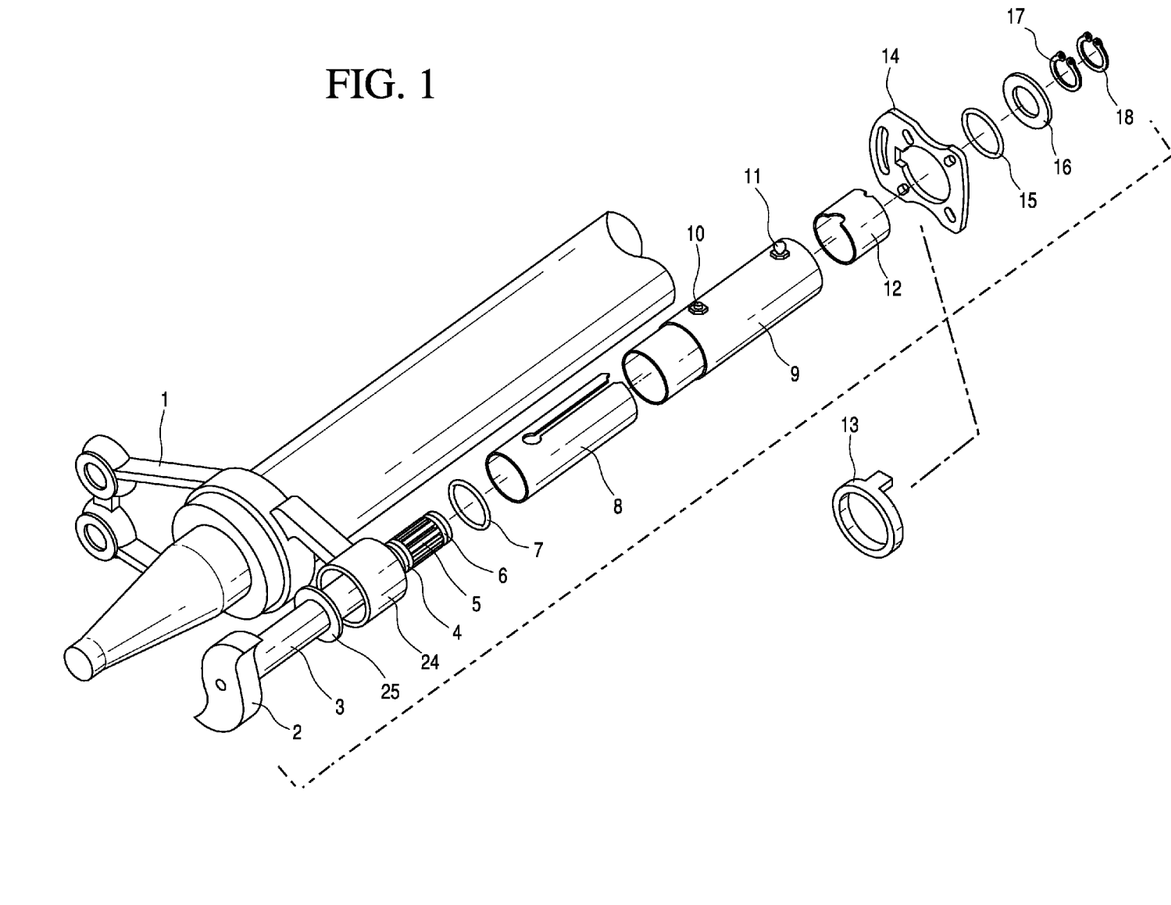
FIG. 1 is a partially exploded front perspective view of an embodiment of an S-cam shaft braking device according to the invention.
Figure 2:
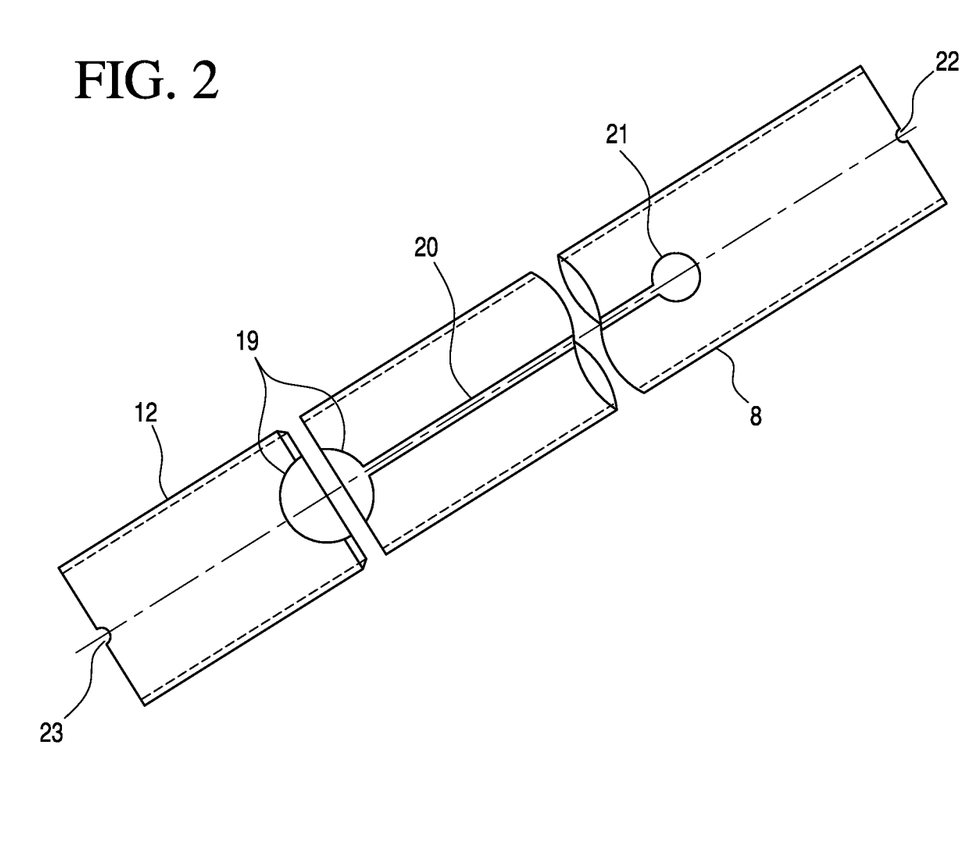
FIG. 2 is a side view of a shaft support bushing of the embodiment of FIG. 1.

As to the embodiment of FIGS. 1 and 2, in order to understand the environment in which this embodiment of the invention can be applied and operated, the exploded view of a wheel S-cam brake system is provided in FIG. 1. FIG. 1 shows a PRIOR ART brake spider 1 in its approximate relationship relative to the device for use with vehicles of the type having brakes actuatable by an S-cam according to the invention. Spider 1 is welded onto the ends of partially illustrated vehicle axles, as will be readily understood, and spider 1 is a known part of braking systems of vehicles. An S-cam head 2, approximating the shape of an "S" is attached to a cylindrical shaft 3, known as the S-cam shaft 3. S-cam shaft 3 must be machined such that the entire shaft length, from head 2 to a snap ring groove 4 has a smooth, machined surface, and shaft 3 includes a set of splines 5 used to affix an unillustrated slack adjuster mechanism. Rotation of shaft 3 rotates S-cam head 2 to spread apart, or otherwise act on, known unillustrated brake shoes to actuate braking.

PRIOR ART spider 1 further has an opening serving as a main rotational bearing point or housing 24. A separate rotational bearing point is located at the end opposite of the S-cam 2 where it is supported by the axle using a cam shaft support bracket (not shown).

Snap ring slot grooves 4 and 6 are machined into shaft 3 in such a way to affix components to shaft 3, the first snap ring slot groove, when used with a snap ring 17 holds the device together, firmly collapsing all gaps. Slot groove 4, and snap ring 17 are not found on known PRIOR ART S-cam systems. Snap ring groove 6 when used with a snap ring 18 is used to affix an unillustrated slack adjuster device onto the end of the shaft 3. A grease seal 7 in conjunction with a spacer washer(s) 25 are used on the outboard end (i.e., end near S-cam 2) of the device to seal the device from debris entering or from grease exiting.

Components of this embodiment of the device for use with vehicles of the type having brakes actuatable by an S-cam include a shaft support bushing or bushing 8 which is installed from the outboard (or spider 1) end of the S-cam device. Shaft support bushing 8 may be of different lengths according to the overall S-cam shaft 3 length. Bushing 8 includes a half moon grease cutout 19 (see FIG. 2) which provides clearance for grease fitting 11 and facilitates travel of grease throughout the device. A longitudinal slot 20 is provided, such as by forming or cutting, in the inner end of bushing 8 which extends towards the outboard (spider) end of the device, but stops in a separate grease clearance hole 21 (FIG. 2) which may be provided at a distance inwardly of (i.e., away from) an S-cam support housing 24 on spider 1. An alignment slot 22 may be provided in the end of bushing 8 to facilitate alignment of the bushing with the grease fitting 11 during installation.

Short bushing 12 also may include a half moon cutout 19 for grease fitting clearance. Bushing 12 is installed from the inboard end of the S-cam device. An alignment slot 23 may be used to align bushing 12 with a grease relief valve 10 and grease fitting 11.

A bushing support tube 9 may house the entire bushing assembly, and may be of various lengths, depending on the length of a respective S-cam shaft 3, in use. Grease fitting 11 may be provided on bushing support tube 9 in such a way that it can be aligned with half-moon cutouts 19, 21 formed in bushing assembly 8, 12. Grease fitting 11 is installed in the inward end (spider end or end away from S-cam end) of the device. Grease relief valve 10 is installed on the outboard (or S-cam end) of the S-cam device in such a way that it provides distribution of grease to fill the inner chamber of the device without over-pressuring the device. Bushing support tube 9 is sealed at both ends with seals and washers 7, 25, 15, and 16.

A mounting adapter bracket 14 is used to anchor the entire S-cam assembly onto the unillustrated axle mountings. Various hole configurations are used to provide for differences in hole patterns and spacing on various axle configurations. A locking ring 13 may then be used to lock the device for use with vehicles of the type having brakes actuatable by an S-cam in place, preventing it from slipping under rotational forces. An unnumbered key or tab may be provided on ring 13 and is fit into the cutout on mounting adapter bracket 14 to lock the ring with the bracket. Fasteners, such as a set screw or screws, in locking ring 13 then anchor the device keeping the bushing support tube 9 or the ring itself secure from slippage, such as from vibrational or rotational forces of the S-cam.

This embodiment of the invention utilizes a bushing support tube 9 which fits into housing 24 and into the cam shaft support bracket on the opposite end, using a mounting adapter bracket or universal bracket 14 which mates with it. This bushing support tube 9 fits in the space where PRIOR ART bushings, as described above, would normally fit. Within this bushing support tube 9, two separate bushings 8, 12, are then press fit into the tube 9 from both ends. Bushings 8, 12 extend outside housing 24 and camshaft support bracket such that they cover substantially the entire length of shaft 3, but do not contact each other.

These bushings 8, 12 or bushing assembly now encloses an S-cam shaft 3, which includes a continuous, smooth machined finish between the "S" head, and the snap ring groove 4. Such achieves the distribution of vibrational and rotational loads over a relatively large surface area. Bearing loads will be initially concentrated on the ends of the bushing assembly, but will shift inwardly as bushings wear from outside in. Further, the bushings 8, 12 dampen loads and vibration forces sufficiently to increase overall life expectancy of the embodiment.

Bushing 12 is installed from the inboard side, while bushing 8 is installed from the outboard (S-cam) side. Both pieces are press fit using alignment tabs 22, 23 which are lined up with grease fittings 10, 11 from FIG. 1 on the bushing support tube 9.

Tabs 22, 23 are also in line with clearance openings 19 and 21 formed in the bushings. Opening 19 may be a half-moon cutouts on inner ends of both bushings 8, 12, and allows clearance for grease fittings. Because bushings 8, 12 are to be installed with a gap between them, a natural grease channel is formed, conveying grease around shaft 3, directed towards other unillustrated grease canals formed on the interior of bushings 8, 12.

A linear slot 20 is provided on bushing 8 and extends between clearance holes 19, 21. Slot 21 provides a grease channel to facilitate distribution of grease down shaft 3. Its primary purpose, however, is to allow friction fitting or press fitting of bushing 8 into bushing support tube 9, without breaking the bushing or requiring special equipment. Once shaft support bushings 8, 12 are aligned and installed in support tube 9, grease relief valve 10 and grease fitting 11 are installed on support tube 9. Grease fitting 11 is used to inject grease into tube 9 of the device, while relief valve 10 regulates the release of grease such that seals 7, 15 installed on the ends of support tube 9 are not ruptured. Seals 7, 15 protect the inner bearing surface from contamination while keeping grease inside. Washers 16, 25 are installed outside of the seals to help seal up the device, and to provide spacing for other components.

Figure 3:
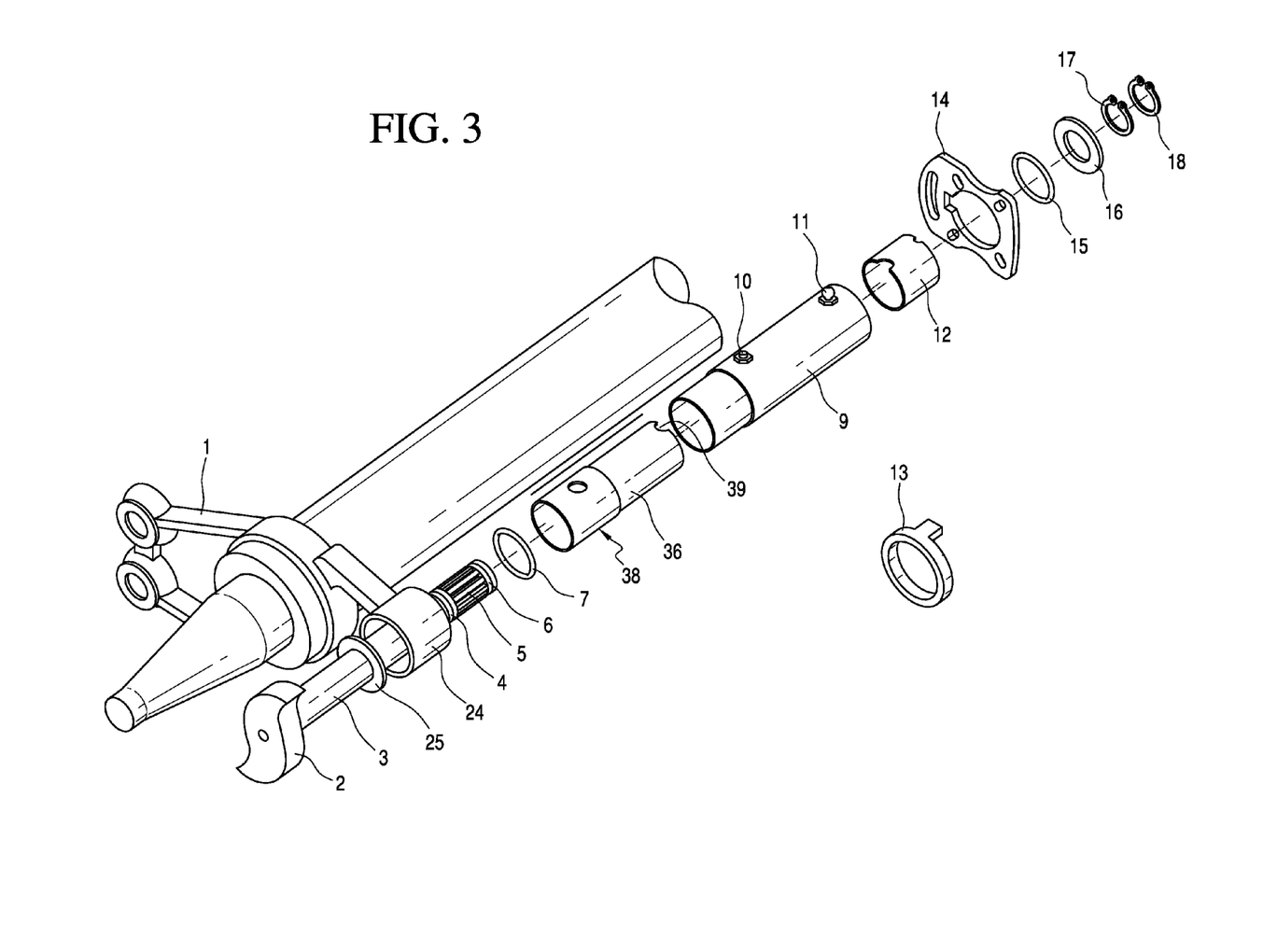
FIG. 3 is a partially exploded front perspective view of another embodiment of an S-cam shaft braking device according to the invention.
Figure 4:
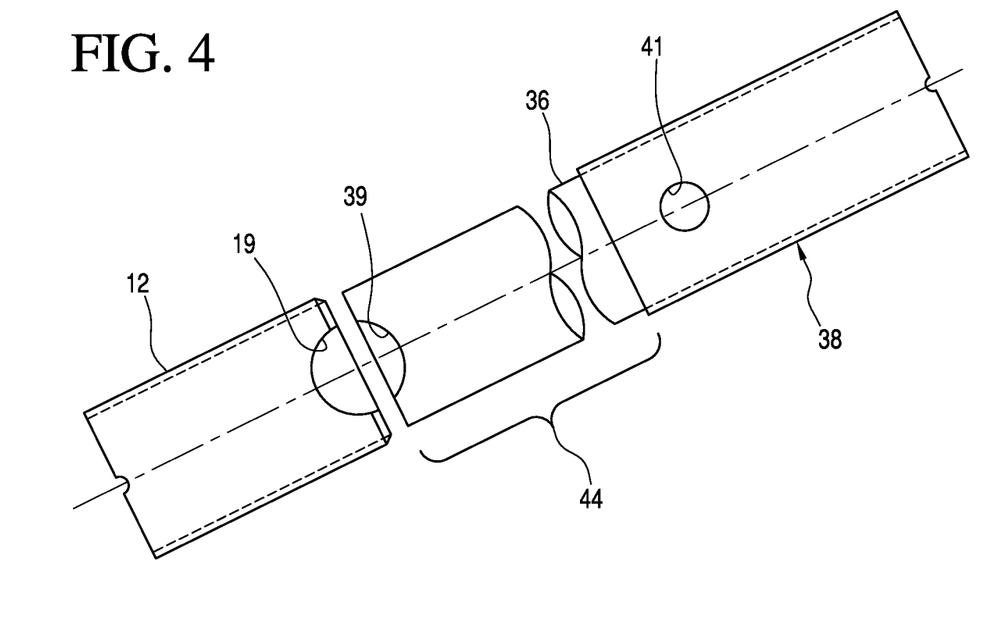
FIG. 4 is a side view of a shaft support bushing of the embodiment of FIG. 3.

FIGS. 3 and 4

It will be appreciated that the embodiment of FIGS. 3 and 4 eliminates the need for the linear slot 20 of the embodiment of FIGS. 1 and 2. It will likewise be appreciated that bushing 38, with its step cut or turned down portion 36 has achieved the objects of the invention in a manner analogous to the structure and function of bushing 8 of the embodiment of FIGS. 1 and 2.

A step cut or turned down area 36 is formed or cut into the inner (inboard) end of the bushing which may have various lengths, such as illustrated elongated bushing or shaft support bushing 38 which extends from the inboard end towards the outboard end of the bushing 38 but which ends a short fixed distance from the end, such that the bushing without the turned down area 36 fits into the axle spider housing 24 with a press fit tolerance, while the inboard section of the bushing 38 which has been turned down has a slip fit tolerance, allowing for the bushing 38 to be slid into the bushing support tube 9 up until the press fit portion, which will then be pressed in, by mechanical or other means. The step cut or turned down area 36 results in a smaller outer diameter in a region 44 (shown in FIG. 4) of bushing 38 than the outer diameter in the region of bushing 38 in which hole 41 is provided, as shown.

A hole 41 is formed or cut into the variable length bushing 38, directly in-line with unillustrated internal grooves formed or cut longitudinally over the length of the inside surface of the variable length bushing 38 and positioned such that the hole 41 lines up directly with a grease fitting, such as fittings 10 and 11 described above, installed on the bushing support tube 9, such that the hole 41 allows grease to flow between the grease fitting 10, 11 and throughout the bearing surfaces.

It can be seen that the embodiments of FIGS. 1-4 including a two-piece elongated bushing assembly or shaft support bushings, bushing support tube, mounting adapter brackets, grease fittings, and other spacers, seals, and rings which when assembled in conjunction with a wheel brake S-cam device in lieu of standard bushing assemblies, increase wear resistance of the S-cam bushings and S-cam. The two-piece bushing assembly may include a bushing 12 and a bushing 8 or 38. Bushing 12 may be press fit into the inboard end (i.e., the end away from the S-cam) of the S-cam device, while bushing 12 or 38 is installed from the outboard end. The longitudinal slit 20 provides for a friction fit installation of bushing 8 in longer support tubes 9. The FIGS. 1-4 bushings 8, 12, and 38 extend close to each other, but make no contact, resulting in a grease trough which facilitates distribution of grease around the circumference of S-cam shaft 3 and into internal grease channels within the inside surface of the bushings. Such likewise provide a bearing surface over the majority of the S-cam shaft. Even though primary loads are initially borne on the ends, loads will shift inward as outer section of the bushings wear. Vibration loads and some torsional loads can also be distributed at different points along the bushings 8, 12, and 38 extending their life. Such spreads the rotational and vibration loads on bushings 8, 12, and 38, increases grease distribution throughout S-cam shaft bearing surfaces, reduces corrosion due to inadequate grease distribution throughout the entire bushing support tube, increasing the life of the system.

S-cam shaft 3 must have a smooth surface, sufficiently free of irregularities so as to avoid wear on bushings 8, 12, and 38; such smooth surface may be machine finished extending from the S-cam end of shaft 3 to the other end.

A series of spacer and washer assemblies are used to reduce the number of size variations of the shaft support bushings and bushing support tubes. A reduced number of standard sizes, splines, and lengths are possible thanks to the use of the spacers and washers to keep the device compact when shorter bushings and brackets are used. By simplifying sizing to whole number lengths, part ordering and inventory is greatly reduced as the number of distinct parts which must be produced or inventoried by part distributors and fleets is significantly reduced. The entire device is sealed on both ends by seals on each end.

Once the bushings are pressed into the bushing support tube 9, the device is installed on a truck trailer, for example, by inserting the bushing support tube 9 into a receiving hole 24 on an end of a truck/trailer axle brake spider 1. The S-cam shaft is then installed in bushing support tube 9. The tube assembly is affixed to the axle by use of axle bracket assembly 14, 13 of FIG. 1 or by a variation of the bracket assembly. Bushing support tube 9 is secured by washers and lock rings. Then grease is charged through grease fitting 11, and the grease is then channeled through unillustrated grooves in the S-cam bushings, thus filling up all voids with grease, with excess grease exiting the grease relief valve 10.

The embodiment of FIGS. 3 and 4 is intended to provide field replaceable bushings. This addresses a common problem identified above. Normally, a long bushing could not be installed into a cylinder in the field. Because the bushing 38 of the embodiment of FIGS. 3 and 4 uses a cut down portion of the long bushing outside diameter except for the last portion of the bushing, e.g., the last few inches of the bushing of he type used on trucks, this problem is likewise solved and requires an unrelieved press fit only on the very last few inches of the bushing.

Figure 5:
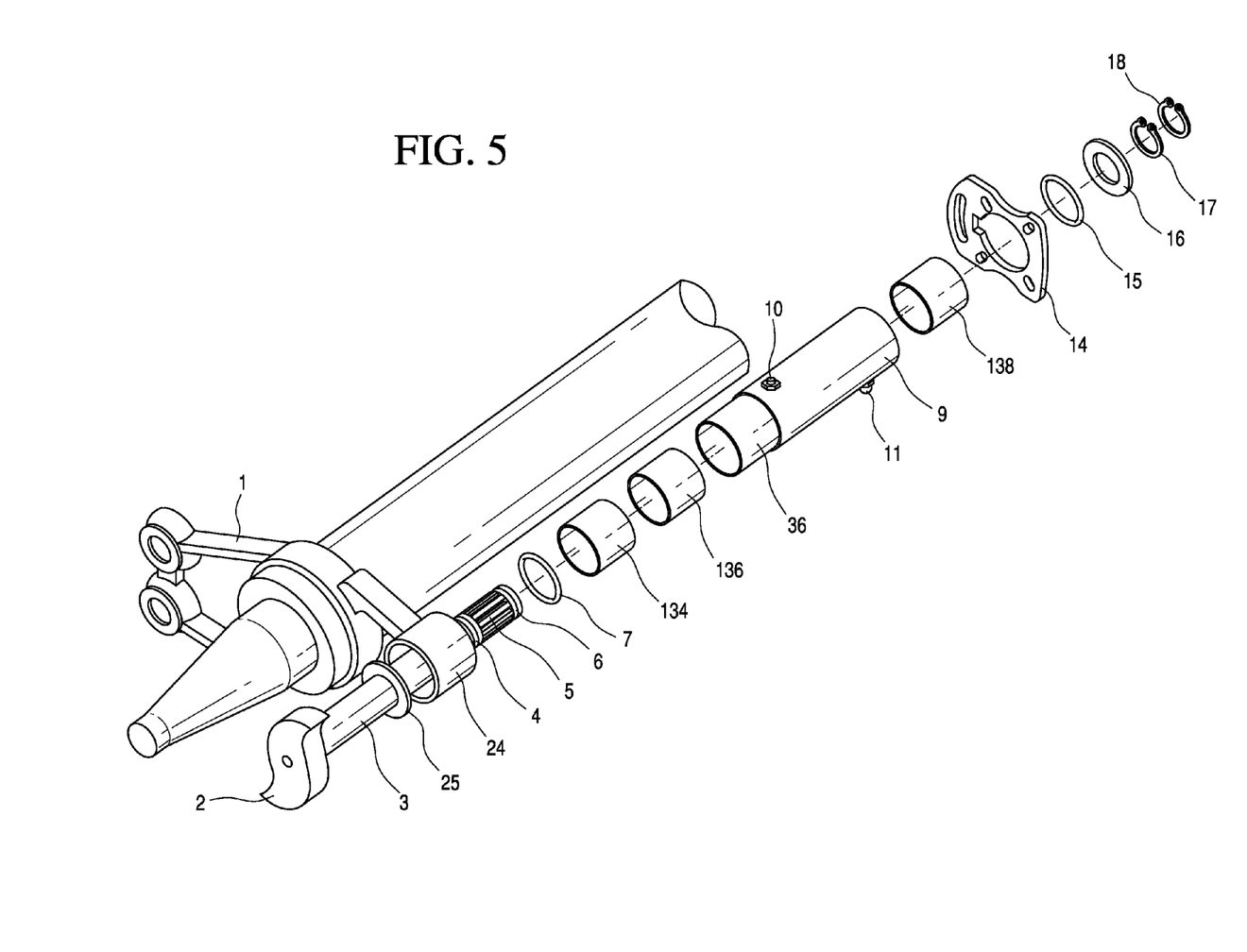
FIG. 5 is a partially exploded front perspective view of a further embodiment of an S-cam shaft braking device according to the invention.
Figure 6:
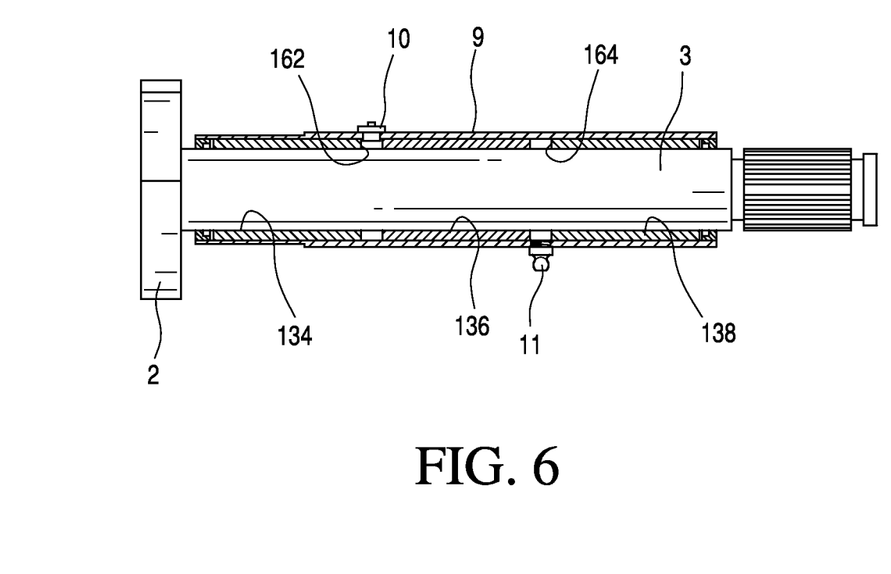
FIG. 6 is a side view of a portion of the embodiment of FIG. 5, shown partially in section, and in an assembled condition.
Figure 7:
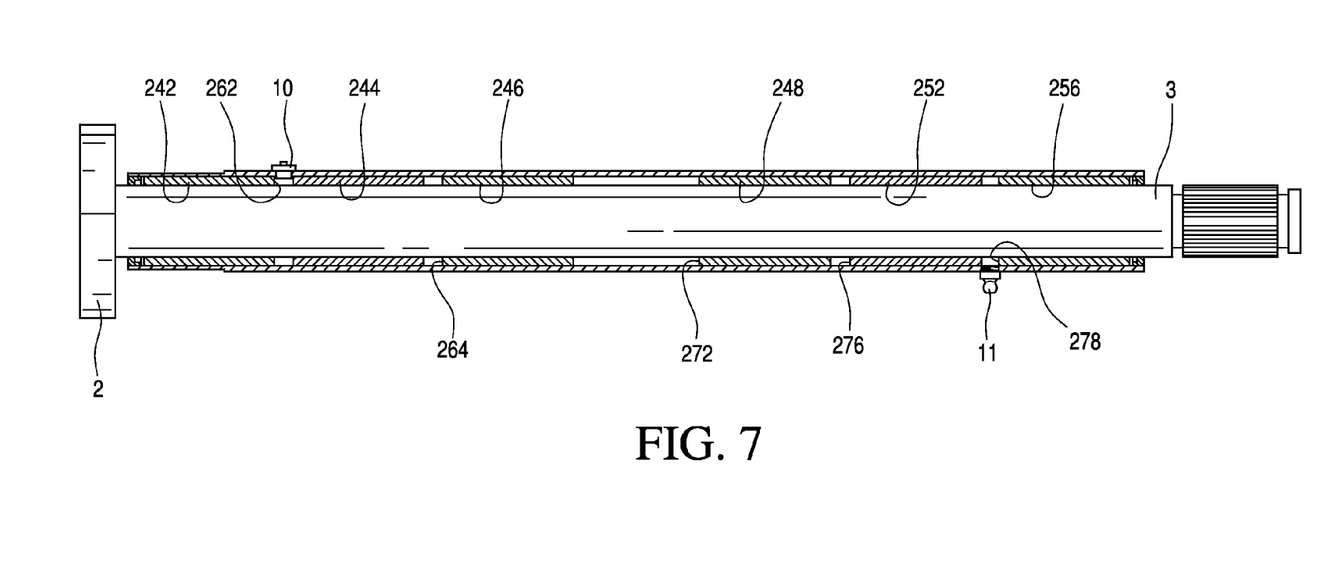
FIG. 7 is a side view of a portion of a still further embodiment of an S-cam shaft braking device according to the invention, shown partially in section, in an assembled condition, shown in a manner similar to FIG. 6.

FIGS. 5-7

These embodiments of FIGS. 5-6, and 7 include providing ("stacking") spaced or unspaced S-cam bushings or shaft support bushings into a bushing support tube 9. The number of bushings installed may be varied based on the user's requirements, and the bushings may be of equal length. Such bushings of the embodiments of FIGS. 5-7 may be termed bushing modules, given their having substantially the same length, and, hence, being interchangeable, as will be readily understood.

FIGS. 5 and 6

The embodiment of FIGS. 5 and 6 may include spaced or unspaced S-cam bushing modules 134, 136, 138 in a bushing support tube 9. Bushing modules or shaft support bushings 134, 136, 138 may be provided without slots or cutouts, as shown, unlike bushing 8 of FIG. 1-2 which has a slot 20, and unlike bushings 12 and 38 of FIGS. 3 and 4 having half-moon cutouts 19 and 39.

The FIGS. 5 and 6 embodiment of the invention includes three modular bushings, such as the illustrated first bushing 134, second bushing 136, and third bushing 138, which may have an equal or substantially equal length in the longitudinal direction, as shown.

In order to enhance distribution of grease and distribution of forces applied to the bushings 134, 136, 138, spaces may be provided between adjacent ones, depending on the intended use. As shown in FIG. 6, which illustrates a side view of FIG. 5 in an assembled position, a first space 162 may be provided between first bushing 134 and second bushing 136. Likewise, a second space 164 may be provided between second bushing 136 and third bushing 138.

As shown in FIG. 6, grease relief valve 10 may be aligned substantially with first space 162, to enhance the release of excess grease through grease relief valve 10. In that regard, it may be readily appreciated that grease fitting 11 may be aligned with space 164 as shown in FIG. 6. When lubricating by inserting grease into grease fitting 11, sufficient force may be applied to insert grease therethrough. In practice, unillustrated grooves may be provided on the inside diameter of bushings 134, 136, 138. For example, an unillustrated groove may be provided on bushing 138 to provide a sufficient space between bushing 138 and shaft 3, so as to define a grease channel, as will be readily appreciated by a person having ordinary skill in the art.

FIG. 7

FIG. 7 illustrates another embodiment of the invention, shown assembled in a manner similar to FIG. 6.

The FIG. 7 embodiment may be provided with more modular bushings than shown in the embodiment of FIGS. 5 and 6. As seen, the FIG. 7, S-cam shaft support device may include a first bushing 242, a second bushing 244, a third bushing 246, a fourth bushing 248, a fifth bushing 252, and a sixth bushing 256, for example, as shown. Between some or all of the bushings, a space may be provided between adjacent ones of the bushings, as shown, depending on the intended use. Thus, a first space 262 may be provided between first bushing 242 and second bushing 244, a second space 264 may be provided between second bushing 244 and third bushing 246, a third space 272 may be provided between third bushing 246 and fourth bushing 248, a fourth space 276 may be provided between fourth bushing 248 and fifth bushing 252, and a fifth space 278 may be provided between fifth bushing 252 and sixth bushing 256.

Each of spaces 262, 264, 272, 276, and 278 may be of the same size, depending on the intended use, or each of spaces 262-278 may have various sizes.

As shown, it is expected that one or more of spaces 262-278 may have a substantially greater size than the others, such as third space 272 shown as being substantially larger than the remaining spaces 262, 264, 276, and 278, and shown as being in the midpoint of tube 9.

That may help allay potential binding between S-cam shaft 3 and bushings such as 242-256 in the event the S-cam shaft 3 has an out-of-straightness condition. Further, a greater distance in the middle helps in situations where shaft 3 is, for example, bent. This may likewise be advantageous in the field, where a user is replacing worn bushings, and would be inserting, for example, bushings 242, 244, and 246 from the end of bushing support tube 9 near S-cam 2, and the remaining three bushings 248, 252, and 256 would be inserted from the other end of bushing support tube 9; i.e., the end near spline 5.

FIGS. 5-7 in Use

Once the selected number of bushing modules is pressed, or pushed, into the bushing support tube 9, the device is installed on a truck trailer, for example, by inserting the bushing support tube 9 into an S-cam hole in housing 24 on truck/trailer axle brake spider 1. The assembly is locked in place by a mounting adapter bracket 14 which secures it to the camshaft support bracket of the axle. Then the S-cam shaft 3 is slid through the bushing support tube 9 and modular bushings and secured by washers and lock rings. Grease is charged through one or more grease fittings 11, and the grease is then channeled through unillustrated grooves in the S-cam bushings, such as bushings 134, 136, 138, thus filling up all voids and air gaps, such as spaces 162, 164 with grease, with excess grease exiting grease relief valve 10.

Once the device is installed, the vibration and twisting loads and forces encountered as the vehicle brake device is actuated are absorbed over multiple bushing modules, each acting as a redundant wear surface for the others. The system works to spread wear loads from the ends of the tubes and distribute the loads over additional surfaces, to slow material wear loss on both the S-cam bushings along with the S-cam shaft, thereby keeping the S-cam centered in the axle much longer than PRIOR ART S-cam shaft bushing systems.

Once bushings become worn and need replacement in the field, modular S-cam bushings can be removed from the S-cam tube enclosure by hand tools, even though the modules have press fit tolerances.

The inventive S-cam bushing modules may also be installed with hand tools by driving or pressing new bushings into the S-cam tube enclosure. This allows truck/trailer operators the ability to replace only the bushings themselves, unlike other S-cam tube enclosures or covers which replace the entire device, or rely on slit bushings or permanently installed bushings on the ends only in order to replace.

One or more of the modular bushings 134-138, and 242-256 may be made of a metal, such as brass, or of a non-metallic material, which may include a plastic, such as a molybdenum disulfide-filled nylon.

It is likewise contemplated that there may be uses for which it is desirable to provide one or more bushings made of non-metallic material which fits into a bushing support tube and extends over the greater part of the S-cam shaft, but without completely connecting, for the purpose of increasing the bearing surface area of an S-cam bushing assembly.

It is contemplated that there may be uses for which it is desirable to provide bushings of different lengths, such as a relatively short bushing and a relatively long bushing, and which may be installed from one or both ends of the bushing support tube. For example, there may be a short bushing having a first length, and a long bushing having a second length which is a multiple of the first length; for example, one and a half, two, three, or more times as long as the first length.

It is contemplated that there may be holes or cut-outs in the bushings which align with the mating holes or cut-outs in the bushing support tube to provide a grease clearance and facilitate the channeling of grease throughout the bushings and the bushing support tube.

It is contemplated that there may be, or in most cases, must be, an S-cam shaft which is machined smooth from the S-cam to an inner snap ring groove, such that respective S-cam bushings make full bearing contact between the same.

It is contemplated that there may be a snap ring groove on the S-cam shaft outwardly of a splined section, used to secure the entire bushing and housing assembly onto the S-cam shaft.

It is contemplated that there may be spacers in addition to the plurality of bushings to accommodate further variations in lengths of S-cam shafts in use.

It is contemplated that there may be the mounting adapter bracket may include a metal plate with a hole in the center and a series of hole patterns to mate up with the various standard hole patterns of a welded axle bracket, such an mounting adapter bracket being used to attach an end of the bushing support tube to an axle.

While this invention has been described as having a preferred design, it is understood that it is capable of further modifications, and uses and/or adaptations of the invention and following in general the principle of the invention and including such departures from the present disclosure as come within the PRIOR ART or customary practice in the art to which the invention pertains, and as may be applied to the central features hereinbefore set forth, and fall within the scope of the invention.

What is claimed is:

1. A device for use with vehicles having brakes actuatable by an S-cam and having a camshaft support bracket, the device comprising:
   an S-cam shaft, the S-cam shaft including a shaft and an S-cam provided on an end of the shaft;
   a mounting adapter bracket, and a bushing support tube, and the mounting adapter bracket being configured for supporting the bushing support tube on a camshaft support bracket of a vehicle, and the bushing support tube being configured for receiving the S-cam shaft therein;
   at least three modular bushings provided in the bushing support tube, and each of the modular bushings being spaced apart along the length of the bushing support tube; and
   the S-cam shaft extending through the at least three shaft modular bushings and being supported thereby, and
   the at least three modular bushings include at least six modular bushings;
   at least two of the modular bushings are spaced apart from each other at a distance greater than a distance between the other modular bushings of the at least six modular bushings;
   each of the at least six modular bushings includes a respective space between adjacent ones of the at least six modular bushings; and
   two of the at least six modular bushings include a space between them which is greater than each of the other spaces between the others of the at least six modular bushings.

2. A device for use with vehicles having brakes actuatable by an S-cam and having a camshaft support bracket, the device comprising:
   an S-cam shaft, the S-cam shaft including a shaft and an S-cam provided on an end of the shaft;
   a mounting adapter bracket, and a bushing support tube, and the mounting adapter bracket being configured for supporting the bushing support tube on a camshaft support bracket of a vehicle, and the bushing support tube being configured for receiving the S-cam shaft therein;
   at least three modular bushings provided in the bushing support tube, and each of the modular bushings being spaced apart along the length of the bushing support tube; and
   the S-cam shaft extending through the at least three shaft modular bushings and being supported thereby; and
   a grease fitting is provided on the bushing support tube, the grease fitting is configured for providing grease into the bushing support tube and between the at least three modular bushings and the shaft; and
   a grease relief valve is provided on the bushing support tube and spaced apart from the grease fitting, the grease relief valve being configured for releasing grease which has been forced into the grease fitting and between the at least three modular bushings and the shaft.

3. A device for use with vehicles having brakes actuatable by an S-cam and having a camshaft support bracket, the device comprising:
   an S-cam shaft, the S-cam shaft including a shaft and an S-cam provided on an end of the shaft;
   a mounting adapter bracket, and a bushing support tube, and the mounting adapter bracket being configured for supporting the bushing support tube on a camshaft support bracket of a vehicle, and the bushing support tube being configured for receiving the S-cam shaft therein;
   at least three modular bushings provided in the bushing support tube, and each of the modular bushings being spaced apart along the length of the bushing support tube; and
   the S-cam shaft extending through the at least three shaft modular bushings and being supported thereby; and
   the shaft includes a length; and
   the at least three modular bushings are provided spaced apart along the length of the bushing support tube and the at least three modular bushings extend substantially along the entire length of the bushing support tube.

* * * * *